US012742873B2

(12) United States Patent
Arage et al.

(10) Patent No.: US 12,742,873 B2
(45) Date of Patent: Sep. 22, 2026

(54) RADAR ENHANCEMENT SYSTEM

(71) Applicant: GM Global Technology Operations LLC, Detroit, MI (US)

(72) Inventors: Alebel H. Arage, Lake Orion, MI (US); Jeremy P. Gray, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 18/806,452

(22) Filed: Aug. 15, 2024

(65) Prior Publication Data

US 2026/0050077 A1 Feb. 19, 2026

(51) Int. Cl.
*G01S 13/66* (2006.01)
*G01S 7/41* (2006.01)
*G01S 13/931* (2020.01)

(52) U.S. Cl.
CPC ............... *G01S 13/66* (2013.01); *G01S 7/411* (2013.01); *G01S 13/931* (2013.01)

(58) Field of Classification Search
CPC ........ G01S 13/66; G01S 7/411; G01S 13/931; G01S 7/414; G01S 7/2921; G01S 13/347; G01S 2013/93271; G01S 7/354; G01S 13/42
See application file for complete search history.

(56) References Cited

U.S. PATENT DOCUMENTS

2014/0285371 A1* 9/2014 Abatzoglou .......... G01S 7/2955
342/21

FOREIGN PATENT DOCUMENTS

CN 211741566 U * 10/2020 ............... G01S 7/02

* cited by examiner

*Primary Examiner* — Resha Desai
*Assistant Examiner* — Bongani Jabulani Mashele
(74) *Attorney, Agent, or Firm* — Honigman LLP; Matthew H. Szalach

(57) ABSTRACT

A radar enhancement system for a vehicle includes a radar sensor having an operating frequency and configured to detect a target, the radar sensor configured to capture radar data including a signal and a controller communicatively coupled with the radar sensor. The controller includes a radar enhancement application and an advanced-driver assistance system (ADAS) function that has a first confidence level. The radar enhancement application includes a pair of alternating center frequencies that includes a first center frequency and a second center frequency different from the first center frequency. The radar enhancement application is configured to alter the operating frequency of the radar sensor using the pair of alternating center frequencies and to define a second confidence level of the ADAS function. The second confidence level is greater than the first confidence level.

20 Claims, 6 Drawing Sheets

RADAR ENHANCEMENT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a radar enhancement system for a vehicle.

Vehicles may be equipped with a variety of sensors to assist in autonomous or manual operation of the vehicle. For example, some vehicles include proximity sensors, image sensors, and radar sensors, among other vehicle sensors. In the example of a radar sensor, the radar sensor may be calibrated by various steps of transmitting and receiving signals. For example, the radar sensor may transmit a signal toward an object and receive a signal back at the radar sensor. The signal is translated to reflect a location of the object that reflected the signal. The calibration process typically marks the object as a function of time, such that the radar sensor may repeatedly issue a signal to monitor the location of the object at regular intervals.

While the standard calibration and tracking process executed using a radar sensor captures and tracks objects, there may be intervals that are missed. For example, during a first tracking interval, the object is detected, but during a second tracking interval the object is missed. The intervals where the object is not detected, or missed, is a result of a multipath effect resulting in an indirect path of the signal. The radar sensor may receive the two paths, one from the object and the indirect path, which may result in a cancellation of the signals. For example, in some instances, the signals may interfere in a way that constructively superpositions the signals or may destructively cancel each other out resulting in no detection of the object. Thus, there is a need for improved or enhanced radar detection of objects to improve the overall confidence in radar systems of vehicles.

SUMMARY

In some aspects, a computer-implemented method when executed by data processing hardware causes the data processing hardware to perform operations. The operations include transmitting, by a radar sensor, a first radar signal at a first center frequency, receiving, from a target, a first reflected signal at the first center frequency, and executing, based on the first received reflected signal and the first center frequency, a first measurement cycle. The operations also include generating, based on the first measurement cycle, a first signal frame, transmitting, by the radar sensor, a second radar signal at a second center frequency, and receiving, from the target, a second reflected signal at the second center frequency. The operations further include executing, based on the received second reflected signal and the second center frequency, a second measurement cycle, generating, based on the second measurement cycle, a second signal frame, and setting, by a radar enhancement application, a detection threshold based on the first measurement cycle and the second measurement cycle.

In some examples, the operations may include determining the second center frequency by identifying a multipath gap defined by a multipath medium. The operations may also include alternating the first center frequency and the second center frequency. Optionally, the operations may include enhancing a fidelity of a trajectory planning application for a vehicle. In some instances, enhancing the fidelity of the trajectory planning application may include decorrelating interfered signals of a multipath medium at a region of interest relative to the target. The operations may include determining the region of interest based on a height of the target, a size of the target, and reflection characteristics of the multipath medium. Optionally, the operations may include processing, by a detection and tracking application, the received signal. In other instances, the operations may include calibrating an advanced-driver assistance system (ADAS) function based on the detection threshold set by the radar enhancement application.

In other aspects, a radar enhancement system for a vehicle includes data processing hardware and memory hardware in communication with the data processing hardware. The memory hardware stores instructions that when executed on the data processing hardware cause the data processing hardware to perform operations. The operations include transmitting, by a radar sensor, a first radar signal at a first center frequency, receiving, from a target, a first reflected signal at the first center frequency, and executing, based on the first received reflected signal and the first center frequency, a first measurement cycle. The operations also include generating, based on the first measurement cycle, a first signal frame, transmitting, by the radar sensor, a second radar signal at a second center frequency, and receiving, from the target, a second reflected signal at the second center frequency. The operations further include executing, based on the received second reflected signal and the second center frequency, a second measurement cycle, generating, based on the second measurement cycle, a second signal frame, and setting, by a radar enhancement application, a detection threshold based on the first measurement cycle and the second measurement cycle.

In other examples, the operations may include determining the second center frequency by identifying a multipath gap defined by a multipath medium. Optionally, the operations may include alternating the first center frequency and the second center frequency. In some instances, the operations may include enhancing a fidelity of a trajectory planning application for the vehicle. In further examples, enhancing the fidelity of the trajectory planning application may include decorrelating interfered signals of a multipath medium at a region of interest relative to the target. The operations may include determining the region of interest based on a height of the target, a size of the target, and reflection characteristics of the multipath medium. Optionally, the operations may include processing, by a detection and tracking application, the received signal. In some examples, the operations may include calibrating an advanced-driver assistance system (ADAS) function based on the detection threshold set by the radar enhancement application.

In further aspects, a radar enhancement system for a vehicle includes a radar sensor having an operating frequency and configured to detect a target, the radar sensor configured to capture radar data including a signal and a controller communicatively coupled with the radar sensor. The controller includes a radar enhancement application and an advanced-driver assistance system (ADAS) function that has a first confidence level. The radar enhancement application includes a pair of alternating center frequencies that includes a first center frequency and a second center frequency different from the first center frequency. The radar enhancement application is configured to alter the operating frequency of the radar sensor using the pair of alternating center frequencies and to define a second confidence level of the ADAS function. The second confidence level is greater than the first confidence level.

In further examples, the radar data may include reflection characteristics of a multipath medium, and the reflection characteristics may define a multipath gap of the multipath medium. Optionally, the radar enhancement application may be configured to determine the second center frequency based on the reflection characteristics of the multipath medium, and the second center frequency may be configured to cover the multipath gap. In some instances, the radar enhancement application may include a plurality of measurement cycles corresponding to each of the first center frequency and the second center frequency, and the radar enhancement application may be configured to decorrelate interfered signals of the multipath medium during at least one of the measurement cycles.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figures 1, 3:
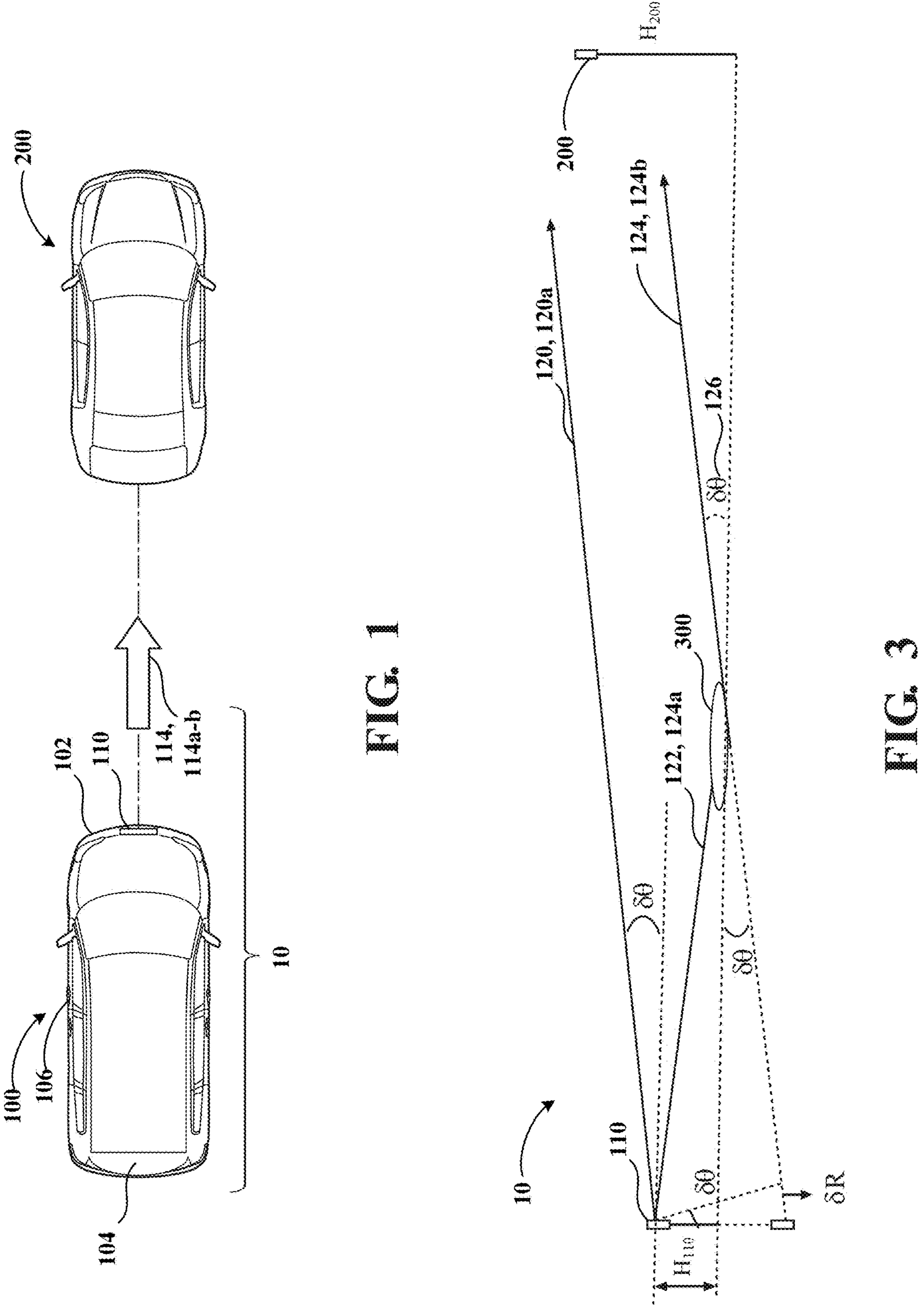
FIG. 1 is a schematic of a vehicle equipped with a radar enhancement system according to the present disclosure following a second vehicle.
FIG. 3 is a schematic diagram of a radar enhancement system according to the present disclosure including a direct path and a reflection path of the radar image.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term “memory” may be a subset of the term “computer-readable medium.” The term “computer-readable medium” does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an “application,” an “app,” or a “program.” Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms “machine-readable medium” and “computer-readable medium” refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term “machine-readable signal” refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
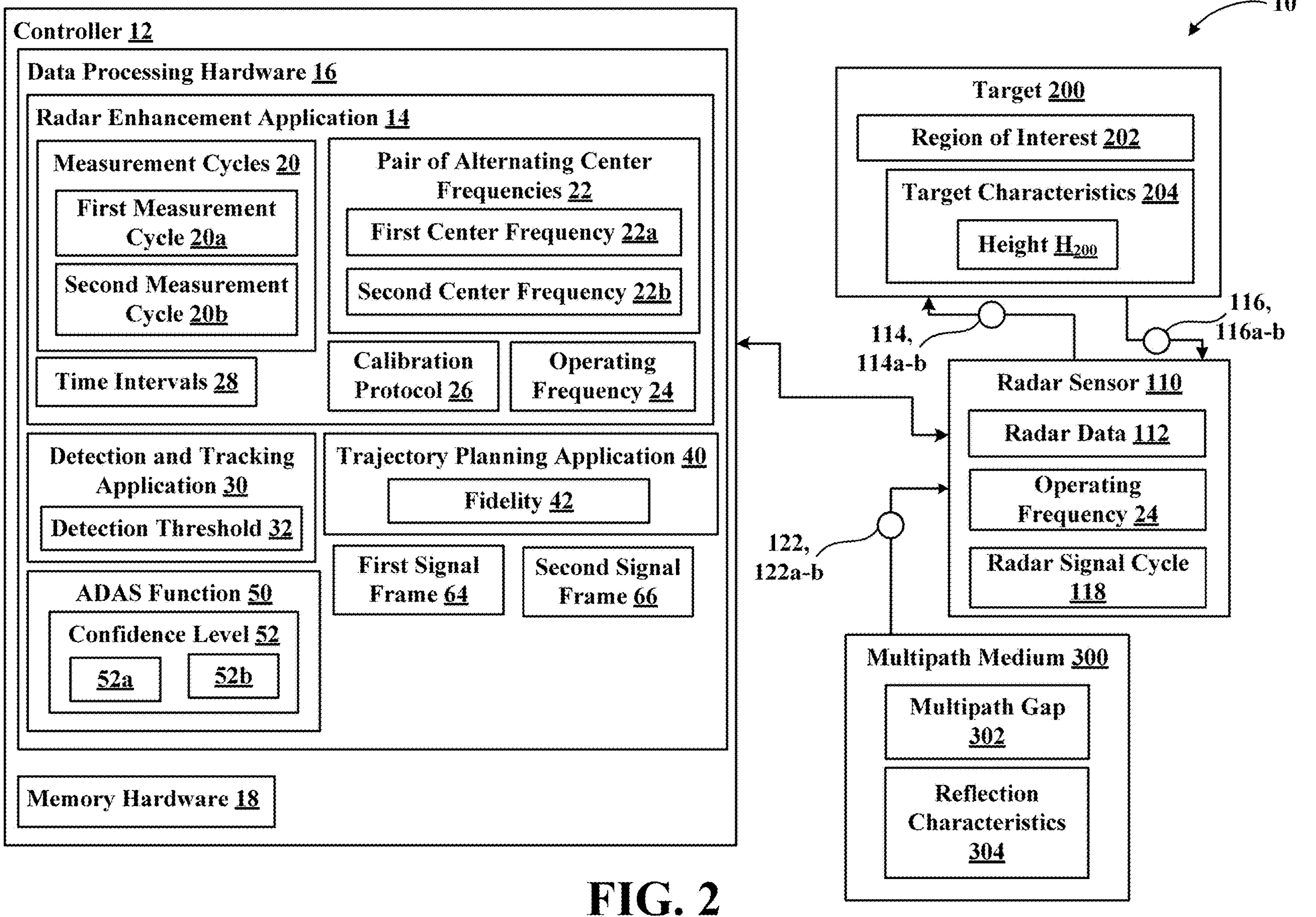
FIG. 2 is an example block diagram of a radar enhancement system according to the present disclosure.

Referring to FIGS. 1-3, a radar enhancement system 10 for a vehicle 100 includes a controller 12 and a radar sensor 110 disposed on the vehicle 100. For example, the radar sensor 110 may be disposed at a front region 102, a rear region 104, and/or a side region 106 of the vehicle 100. It is also contemplated that the radar sensor 110 may be disposed at any practicable location along the vehicle 100 to capture radar data 112. The vehicle 100 may be configured as a manual, autonomous, or semi-autonomous vehicle 100, such that the controller 12 of the vehicle 100 may be configured to execute various autonomous functions. The radar enhancement system 10 is configured to improve the operational functionality of the radar sensor 110 to detect and monitor a target 200. For example, FIG. 1 illustrates an exemplary vehicle 100 equipped with the radar sensor 110, which detects a target 200. In the illustrated example, the target 200 is another vehicle. However, the target 200 may be any object proximate to the vehicle 100 and captured by the radar sensor 110. For example, the target 200 may include, but is not limited to, surrounding vehicles, pedestrians, cyclists, animals, potholes, manholes, road debris, bridges, guardrails, and any other object that may be present near the vehicle 100.

The controller 12 is configured with a radar enhancement application 14 that is executed by data processing hardware 16 of the controller 12. The controller 12 also includes memory hardware 18 that is communicatively coupled with the data processing hardware 16. The memory hardware 18 stores instructions that, when executed on the data processing hardware 16, cause the data processing hardware 16 to perform operations, described herein. The controller 12 is also communicatively coupled with the radar sensor 110 to receive the radar data 112, which is utilized by the radar enhancement application 14, described in more detail below. The controller 12 is also configured with a detection and tracking application 30, a trajectory planning application 40, and an advanced-driver assistance system (ADAS) function 50, each described in more detail below. The radar enhancement application 14 is configured to facilitate the operational functionality of each of the detection and tracking application 30, the trajectory planning application 40, and the ADAS function 50, which improves the overall operational functionality of the radar sensor 110 and confidence of a driver in outputs provided from the controller 12.

As described in more detail herein, the ADAS function 50 has a confidence level 52 that reflects a confidence of the ADAS function 50 in the radar data 112 captured by the radar sensor 110 to execute corresponding operations of the ADAS function 50. For example, the ADAS function 50 may include, but is not limited to, parking, super-cruise, automatic emergency braking, and other potential features of the ADAS function 50 or controller 12. To facilitate a high degree of confidence, the radar enhancement application 14 executes measurement cycles 20 to determine a pair of alternating center frequencies 22 for use by the radar sensor 110, described in more detail below.

The pair of alternating center frequencies 22 includes a first center frequency 22*a* and a second center frequency 22*a* that is different from the first center frequency 22*a*. The pair of alternating center frequencies 22 correspond to an operating frequency 24 of the radar sensor 110. For example, the operating frequency 24 generally defines the frequency at which a radar signal 114 is generated. The radar enhancement application 14 is configured to alter the operating frequency 24 of the radar sensor 110 using the pair of alternating center frequencies 22, described in more detail below. The pair of alternating center frequencies 22 include a first center frequency 22*a* and a second center frequency 22*b* that is different from the first center frequency 22*a*.

Referring now to FIGS. 1-4, the radar enhancement application 14 is configured to execute a calibration protocol 26 to determine the second center frequency 22*b*. The calibration protocol 26 includes executing the radar sensor 110 at the first center frequency 22*a* for a predetermined number of radar signal cycles 118. For example, the radar sensor 110 is configured to transmit a first radar signal 114*a* at the first center frequency 22*a* toward the target 200 for the predetermined number of radar signal cycles 118. The target 200 reflects a first reflected signal 116*a* at the first center frequency 22*a*, which is received by the radar sensor 110. The radar enhancement application 14 marks the target 200 as a function of time based on the first reflected signal 116*a* and proceeds to issue a radar signal 114 at time intervals 28 defined as part of the calibration protocol 26.

The radar signal 114 is translated along a signal path 120 that fans out from the radar sensor 110 to capture the target 200. The signal path 120 also captures a multipath medium 300, which interrupts the signal path 120, described below. For example, by transmitting the radar signals 114*a* at the first center frequency 22*a*, the radar data 112 will eventually include a multipath gap 302 defined by the reflection of the radar signal 114 back to the radar sensor 110 as an interfered signal 122. The interfered signal 122 may neutralize or cancel the reflection signal 116 when the radar signal cycles 118 are continually executed at the first center frequency 22*a*. Thus, the calibration protocol 26 of the radar enhancement application 14 is configured to identify the multipath gaps 302 while simultaneously defining a region of interest 202 of the target 200 to refine the radar sensor 110.

The region of interest 202 is defined by target characteristics 204 of the target 200 and reflection characteristics 304 of the multipath medium 300. The target characteristics 204 may include, but are not limited to, a height $H_{200}$ of the target 200 and/or a size of the target 200. The radar enhancement application 14 may be configured to identify the target characteristics 204 based on the reflection signal 116 received at the radar sensor 110. Further, the radar enhancement application 14 can identify the interference signal 122 and the corresponding multipath gap 302 based on a lack of radar data 112 received at one of the predetermined radar signal cycles 118. It is generally contemplated that the multipath gap 302 may be defined on alternating radar signal cycles 118, such that approximately every other radar signal cycle 118 results in a canceled reflection signal 116 as a result of the interfered signal 122.

Figures 4, 5:
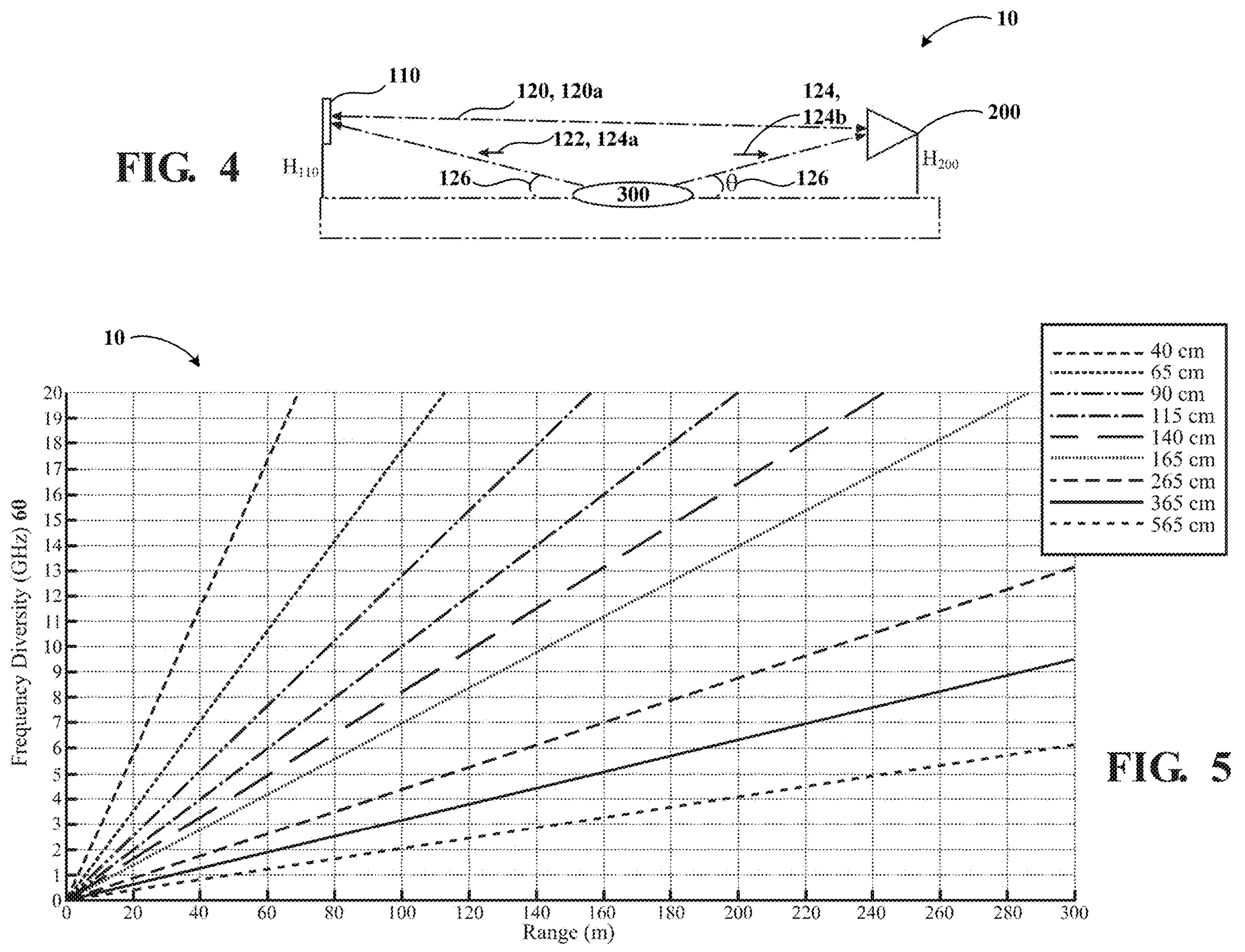
FIG. 4 is a schematic diagram of a radar enhancement system according to the present disclosure including a grazing angle.
FIG. 5 is an example graph of a frequency diversity of a radar enhancement system according to the present disclosure.

FIGS. 3 and 4 illustrate the radar sensor 110 issuing a radar signal 114 having a signal path 120 to detect one or more targets 200. The signal path 120 of the radar signal 114 is defined by the target 200 and the multipath medium 300, described below. For example, the signal path 120 is configured to fan from the radar sensor 110 to broadly capture potential targets 200. The signal path 120 includes a target path 120*a*, which is defined by a direct path to the target 200. The target path 120*a* may be determined, at least in part, by the radar sensor 110 receiving the reflection signal 116 from the target 200.

For example, FIG. 3 illustrates the target path 120*a* as being angled relative to the radar sensor 110, which illustrates the target characteristics 204. In this example, the target characteristics 204 include that the height $H_{200}$ of the target 200 is greater than that of the placement of the radar sensor 110. As a result, the target path 120*a* is ultimately an upward angle relative to the radar sensor 110. In another example, the target path 120*a* illustrated in FIG. 4 may be defined as a direct path based on the height $H_{200}$ of the target 200 being generally similar to a height $H_{110}$ of the placement of the radar sensor 110. Thus, the target path 120*a* is generally defined by the target characteristics 204 of the target 200.

As mentioned above, the radar signal 114 may be interfered with by the multipath medium 300. For example, the multipath medium 300 may be a road surface, which may distort the signal path 120. The distortion of the signal path 120 defines the multipath gap 302, which may also be defined as a multipath effect 302. For example, the multipath effect 302 results in duplicate signals 116, 122 received at the radar sensor 110 resulting in a gap in the radar data 112. The interfered signals 122 may have a reflection path 124 that is defined by a grazing angle 126 relative to the multipath medium 300. In some examples, the multipath medium 300 defines multiple reflection paths 124.

For example, a first reflection path **124*a* may be defined between the multipath medium 300 and the radar sensor 110 and a second reflection path 124*b* may be defined between the multipath medium 300 and the target 200. As a result, the radar sensor 110 receives the interfered signal 122 and the reflection signal 116 during a single radar signal cycle 118. In some instances, the interfered signal 122 may neutralize or cancel the reflection signal 116, such that the radar sensor 110, at the first center frequency 22*a*, receives the reflection signal 116 from the target 200 every other radar signal cycle 118. As described further below, the radar enhancement application 14 is configured to improve detection of the target 200 by minimizing the multipath effect 302**.

Figure 6:
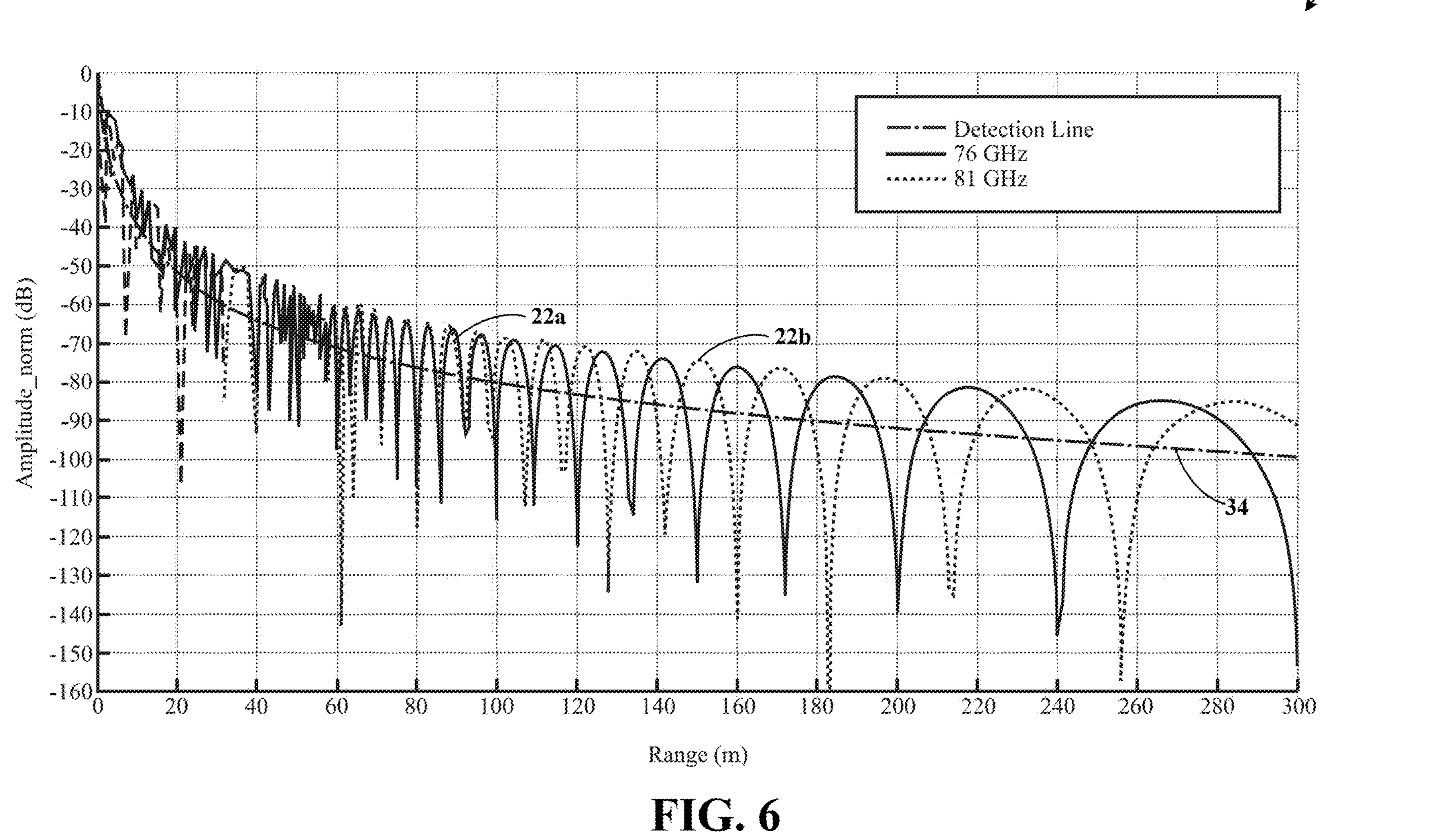
FIG. 6 is an example graph of a multipath effect of radar detection and detection line of a radar enhancement system according to the present disclosure, the detection line overlapping with each multipath of the radar detection.
Figure 7:
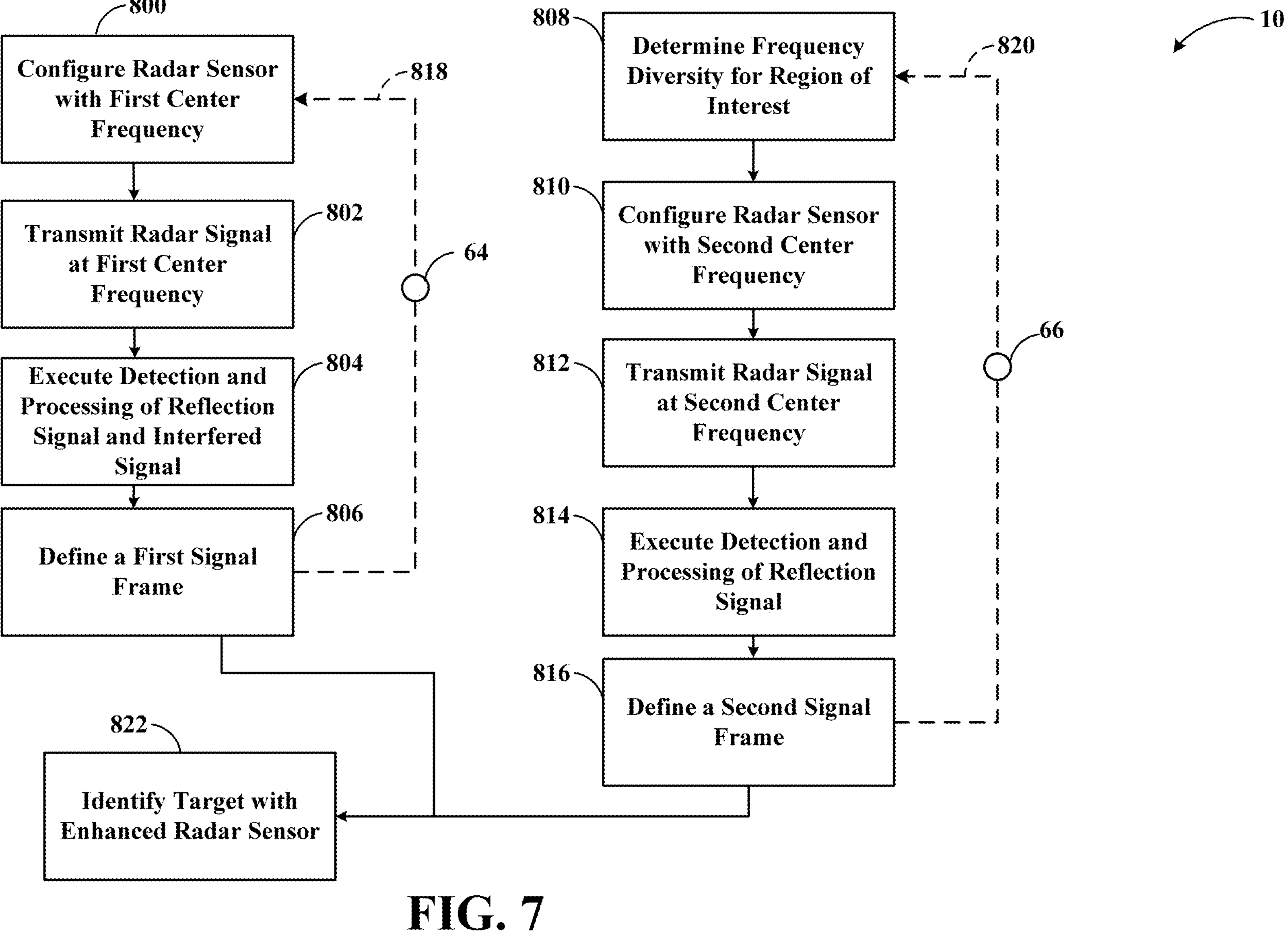
FIG. 7 is an exemplary flow diagram of a method of executing a radar enhancement system according to the present disclosure.

With further reference to FIGS. 1-6, the radar enhancement system 14 is configured to determine a second center frequency **22*b* based on the region of interest 202 of the target 200. The second center frequency 22*b* is configured to cover the multipath gap 302, such that the controller 12 is continually receiving complete radar data 112 at each radar signal cycle 118. FIGS. 5 and 6 illustrate exemplary graphs that illustrate a frequency diversity for the second center frequency 22*b* (FIG. 5) and a multipath effect based on different frequency amplitudes (i.e., a first center frequency 22*a* and a second center frequency 22*b*) (FIG. 6**).

With respect to FIG. 5, a frequency diversity 60 may be defined by the effect of interference based on the region of interest 202 of the target 200 and the target characteristics 204. For example, the frequency diversity 60 may depend on the reflectivity of the target 200, such that the radar enhancement application 14 is configured to determine the second center frequency **22*b* by incrementally increasing the frequency diversity 60 until the frequency diversity correlates with one or more of the target characteristics 204 (i.e., the height $H_{200}$ of the target 200). The radar enhancement application 14 may also consider the multipath medium 300, such that a height $H_{110}$ of the radar sensor 110 relative to the multipath medium 300 (i.e., the road surface) may be utilized by the radar enhancement application 14 to determine the frequency diversity 60. Thus, FIG. 5 illustrates various outcomes utilizing a range of frequency diversities 60** at increased target heights $H_{200}$.

With respect to FIG. 6, a multipath effect 302 over a multipath medium 300 is illustrated for a first center frequency **22*a* and a second center frequency 22*b*. While the first and second center frequencies 22*a*, 22*b* are illustrated as being seventy-six (76) and eighty-one (81) gigahertz (GHz), respectively, it is contemplated that the center frequencies 22 may range or otherwise vary depending on the configurations described herein. As illustrated, either center frequency 22 ultimately results in a multipath gap 302 at an intermittent interval (i.e., every other radar signal cycle 118). The radar enhancement application 14 is configured to determine, via an inverse range fourth power law, an operating frequency 24 that consistently obtains radar data 112 at each radar signal cycle 118**.

The radar enhancement application 14 may utilize the frequency diversity 60, described above, to determine the second center frequency **22*b*, which is then utilized to identify the operating frequency 24. The operating frequency 24 includes both the first center frequency 22*a* and the second center frequency 22*b*, as determined by the radar enhancement application 14. FIG. 6 illustrates that overlap of the first center frequency 22*a* and the second center frequency 22*b*, which in turn illustrates that alternating the center frequencies 22 covers the entirety of the radar signal cycles 118. Thus, the interfered signals 122 are nullified, as the center frequency 22 of the operating frequency 24 alternates per radar signal cycle 118**.

Referring again to FIGS. 2-6, the radar enhancement application 14 executes the measurement cycles 20, which correspond to each of the first center frequency **22*a* and the second center frequency 22*b*. The radar enhancement application 14 generates a first signal frame 64 based on a first measurement cycle 20*a* and generates a second signal frame 66 based on a second measurement cycle 20*b*. Each of the measurement cycles 20 is executed based on the center frequency 22 corresponding to the operational frequency 24 of the radar sensor 110. For example, the radar enhancement application 14 may continuously refine and adjust at least one of the center frequencies 22 based on the radar data 112**.

The radar enhancement application 14 is configured to decorrelate the interfered signals 122 of the multipath medium 300 during at least one of the measurement cycles 20. The result of the measurement cycles 20 is a continuous pair of alternating center frequencies 22, with a first center frequency **22*a* and a second center frequency 22*b* different from the first center frequency 22*a*. The radar enhancement application 14 is configured to alter the operating frequency 24 of the radar sensor 110 using the pair of alternating center frequencies 22 by alternating the first center frequency 22*a* with the second center frequency 22*b* at alternate radar signal cycles 118**.

The alternating center frequencies 22 advantageously improves the detection of the radar sensor 110 and ultimately improves confidence in the radar sensor 110. Further, the frequency diversity 60 enhances the detection range of the radar sensor 110, as the radar enhancement application 14 may alter the center frequencies 22 depending on a range of detection. For example, the detection range may be determined based on the radar data 112, and the radar enhancement application 14 can utilize the detection range to identify the corresponding frequency diversity 60. The result is an adjustment to one of the center frequencies 22 to improve detection by the radar sensor 110.

The radar enhancement application 14 may set a detection threshold 32 based on the measurement cycles 20, which may be utilized by the detection and tracking application 30. For example, the detection and tracking application 30 may process the reflection signal 116 based on the detection threshold 32 for a given radar signal cycle 118. The detection threshold 32 is designed for the alternating structure of the operating frequency 24, as set forth by the radar enhancement application 14. Thus, the detection and tracking application 30 may utilize the detection threshold 32 to inform a detection line 34 of reflection between the radar sensor 110 and the target 200. The detection line 34 may correspond to the intermittent level, described above with respect to FIG. 6.

With further reference to FIGS. 1-6, the pair of alternating center frequencies 22 of the radar enhancement application 14 enhances a fidelity 42 of the trajectory planning application 40 for the vehicle 100. The fidelity 42 is improved by on-time and reliable identification and tracking of in-path and out-of-path obstacle objects (i.e., targets 200). The radar enhancement application 14 enhances the fidelity 42 of the trajectory planning application 40 by decorrelating the interfered signals 122 of the multipath medium 300 at the region of interest 202 relative to the target 200.

The controller 12 may calibrate the ADAS function based on the detection threshold 34 set by the radar enhancement application 14. As mentioned above, the ADAS function has a confidence level 52, which is informed by the efficacy of the radar sensor 110. For example, the multipath gaps 302 may result in a reduced confidence level 52 of the ADAS function as compared to when the radar enhancement application 14 is executed to enhance the radar data 112. Thus, the ADAS function 50 may have a first confidence level 52*a*, and the radar enhancement application 14 is configured to define a second confidence level 52*b* of the ADAS function 50 that is greater than the first confidence level 52*a*. The increased confidence level 52*b* is a result of the consistent detection of the target 200 achieved by the pair of alternating center frequencies 22 determined by the radar enhancement application 14.

The increased confidence level 52 of the ADAS function 50 correlates to both an autonomous confidence in relying on the radar sensor 110 as well as a manual (i.e., driver) reliance on the radar sensor 110. Thus, the enhanced confidence level 52 corresponds to an increased trust, or confidence, in the ability of the radar sensor 110 to detect an object (i.e., the target 200) within proximity of the vehicle 100 during operation. The controller 12 may, thus, confidently execute one or more ADAS functions 50 in response to the radar data 112 as a result of the enhanced radar sensor 110.

With reference now to FIGS. 1-8, exemplary flow diagrams of a method of implementing the radar enhancement system 10 are illustrated and described. With specific reference to FIG. 7, the radar sensor 110 is configured, at 800, with the first center frequency 22*a*. The radar sensor 110 transmits, at 802, the radar signal 114 at the first center frequency 22*a*. The radar enhancement system 14 executes, at 804, detection and processing of the reflection signal 116 and the interfered signal 122. The radar enhancement system 10 defines, at 806, a first signal frame 64 and repeats steps 800-804 for a predetermined period of time. The radar enhancement system 14 then determines, at 808, a frequency diversity 60 for the region of interest 202. The radar sensor 110 is configured, at 810, with the determined second center frequency 22*b*. The radar sensor 110 transmits, at 812, the radar signal 114 at the second center frequency 22*b*. The radar enhancement system 14 executes, at 814, detection and processing of the reflection signal 116. The radar enhancement system 10 defines, at 816, a second signal frame 66. The radar enhancement system 10 alternates, at 818 and 820, between calibrating the radar sensor 110 with the first center frequency 22*a* and the second center frequency 22*b*. At 822, the controller 12 identifies the target 200 with the enhanced radar sensor 110 through execution of the detection and tracking application 30 and trajectory planning application 40.

Figure 8:
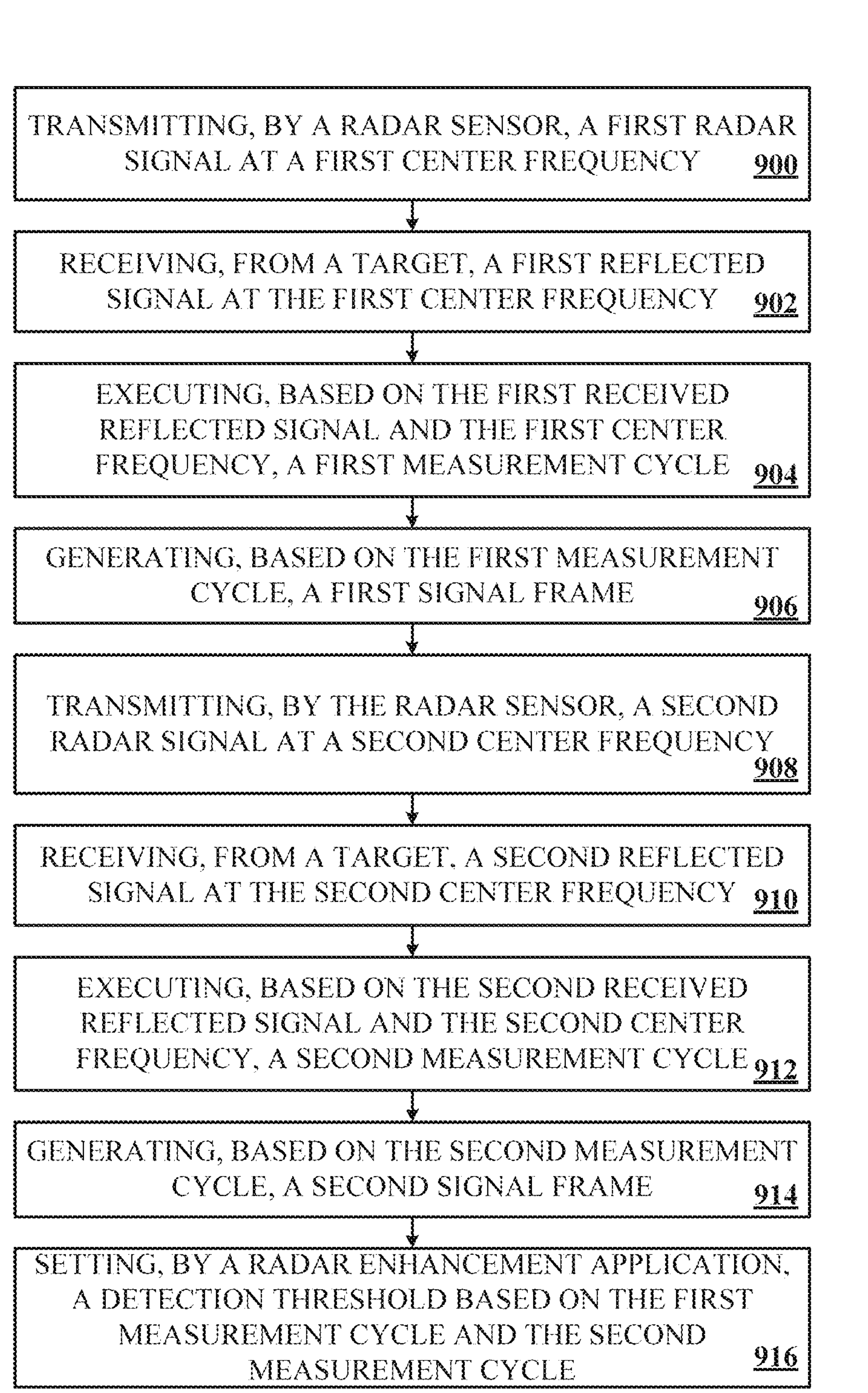
FIG. 8 is another exemplary flow diagram of a method of executing a radar enhancement system according to the present disclosure.

With specific reference to FIG. 8, the radar sensor 110 transmits, at 900, a first radar signal 114 at a first center frequency 22*a* and receives, at 902, from a target 200, a first reflected signal 116*a* at the first center frequency 22*a*. The controller 12 executes, at 904, a first measurement cycle 20*a* based on the first received reflected signal 116*a* and the first center frequency 22*a*. The radar enhancement system 10 generates, at 906, a first signal frame 64 based on the first measurement cycle 20*a*. The radar sensor 110 transmits, at 908, a second radar signal 114*b* at the second center frequency 22*b*. The radar enhancement application 14, at 910, receives a second reflected signal 116*b* from the target 200 at the second center frequency 22*b* and executes, at 912, a second measurement cycle 20*b* based on the received second reflected signal 116*b* and the second center frequency 22*b*. The radar enhancement system 10 generates, at 914, a second signal frame 66. The radar enhancement application 14 then sets, at 916, a detection threshold 34 based on the first measurement cycle 20*a* and the second measurement cycle 20*b*.

With further reference to FIGS. 1-8, the radar enhancement system 10 advantageously improves the confidence of a driver or operational system of a vehicle 100 by enhancing detection capabilities of the radar sensor 110. The radar enhancement application 14 implements the pair of alternating center frequencies 22 to minimize or eliminate the multipath gap 302 that may otherwise be present with a single center frequency. Thus, the radar data 112 provides consistent tracking of the target 200 over the operational duration. The consistent tracking improves the confidence of both manual and autonomous functions of the vehicle 100.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

transmitting, by a radar sensor, a first radar signal at a first center frequency;

receiving, from a target, a first reflected signal at the first center frequency;

executing, based on the received first reflected signal and the first center frequency, a first measurement cycle;

generating, based on the first measurement cycle, a first signal frame;

transmitting, by the radar sensor, a second radar signal at a second center frequency;

receiving, from the target, a second reflected signal at the second center frequency;

executing, based on the received second reflected signal and the second center frequency, a second measurement cycle;

generating, based on the second measurement cycle, a second signal frame; and setting, by a radar enhancement application, a detection threshold based on the first measurement cycle and the second measurement cycle.

2. The method of claim 1, further including determining the second center frequency by identifying a multipath gap defined by a multipath medium.

3. The method of claim 1, further including alternating the first center frequency and the second center frequency.

4. The method of claim 1, further including enhancing a fidelity of a trajectory planning application for a vehicle.

5. The method of claim 4, wherein enhancing the fidelity of the trajectory planning application includes decorrelating interfered signals of a multipath medium at a region of interest relative to the target.

6. The method of claim 5, further including determining the region of interest based on a height of the target, a size of the target, and reflection characteristics of the multipath medium.

7. The method of claim 1, further including processing, by a detection and tracking application, at least one of the first received signal and the second received signal.

8. The method of claim 1, further including calibrating an advanced-driver assistance system (ADAS) function based on the detection threshold set by the radar enhancement application.

9. A radar enhancement system for a vehicle, the radar enhancement system comprising:

data processing hardware; and memory hardware in communication with the data processing hardware, the memory hardware storing instructions that when executed on the data processing hardware cause the data processing hardware to perform operations comprising:

transmitting, by a radar sensor, a first radar signal at a first center frequency;

receiving, from a target, a first reflected signal at the first center frequency;

executing, based on the first reflected received signal and the first center frequency, a first measurement cycle;

generating, based on the first measurement cycle, a first signal frame;

transmitting, by the radar sensor, a second radar signal at a second center frequency;

receiving, from the target, a second reflected signal at the second center frequency;

executing, based on the received second reflected signal and the second center frequency, a second measurement cycle;

generating, based on the second measurement cycle, a second signal frame; and setting, by a radar enhancement application, a detection threshold based on the first measurement cycle and the second measurement cycle.

10. The radar enhancement system of claim 9, further including determining the second center frequency by identifying a multipath gap defined by a multipath medium.

11. The radar enhancement system of claim 10, further including alternating the first center frequency and the second center frequency.

12. The radar enhancement system of claim 9, further including enhancing a fidelity of a trajectory planning application for the vehicle.

13. The radar enhancement system of claim 12, wherein enhancing the fidelity of the trajectory planning application includes decorrelating interfered signals of a multipath medium at a region of interest relative to the target.

14. The radar enhancement system of claim 13, further including determining the region of interest based on a height of the target, a size of the target, and reflection characteristics of the multipath medium.

15. The radar enhancement system of claim 9, further including processing, by a detection and tracking application, at least one of the first received signal and the second received signal.

16. The radar enhancement system of claim 9, further including calibrating an advanced-driver assistance system (ADAS) function based on the detection threshold set by the radar enhancement application.

17. A radar enhancement system for a vehicle, the radar enhancement system comprising:

a radar sensor having an operating frequency and configured to detect a target, the radar sensor configured to capture radar data including a signal; and a controller communicatively coupled with the radar sensor and including a radar enhancement application and an advanced-driver assistance system (ADAS) function having a first confidence level, the radar enhancement application including a pair of alternating center frequencies including a first center frequency and a second center frequency different from the first center frequency, the radar enhancement application configured to alter the operating frequency of the radar sensor using the pair of alternating center frequencies and to define a second confidence level of the ADAS function, the second confidence level being greater than the first confidence level.

18. The radar enhancement system of claim 17, wherein the radar data includes reflection characteristics of a multipath medium, the reflection characteristics defining a multipath gap of the multipath medium.

19. The radar enhancement system of claim 18, wherein the radar enhancement application is configured to determine the second center frequency based on the reflection characteristics of the multipath medium, the second center frequency being configured to cover the multipath gap.

20. The radar enhancement system of claim 18, wherein the radar enhancement application includes a plurality of measurement cycles corresponding to each of the first center frequency and the second center frequency, the radar enhancement application being configured to decorrelate interfered signals of the multipath medium during at least one of the measurement cycles.

* * * * *